(No Model.)

F. J. HERRICK.
LEMON SQUEEZER.

No. 331,236. Patented Nov. 24, 1885.

Witnesses.
Emil Hertel
W. P. Small

Inventor.
Frank J. Herrick
by Earle H. Smith
Atty

UNITED STATES PATENT OFFICE.

FRANK J. HERRICK, OF NEW BRITAIN, CONNECTICUT.

LEMON-SQUEEZER.

SPECIFICATION forming part of Letters Patent No. 331,236, dated November 24, 1885.

Application filed July 8, 1885. Serial No. 171,029. (No model.)

*To all whom it may concern:*

Be it known that I, FRANK J. HERRICK, of New Britain, in the county of Hartford and State of Connecticut, have invented certain new and useful Improvements in Lemon-Squeezers, whereof the following is a specification.

My invention relates to those lemon-squeezers that are made wholly of metal; and it consists in the structure of the presser and bowl constituting the two parts of the implement, and in the means of uniting them.

Figure 1:
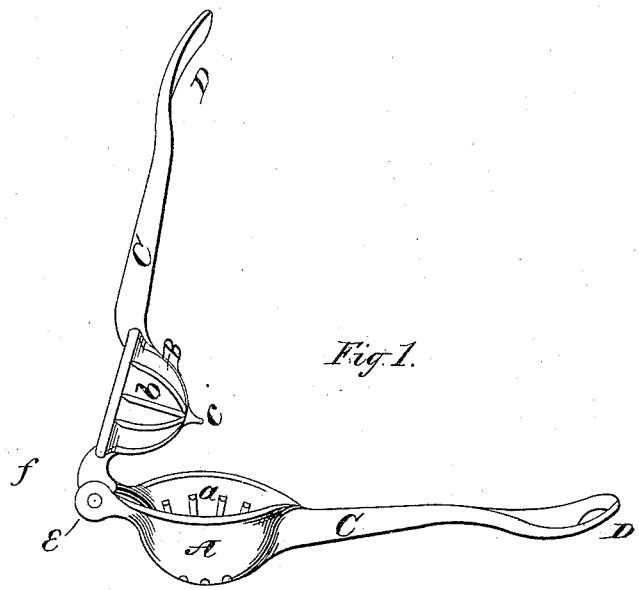
Figure 2:
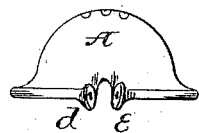
Figure 3:
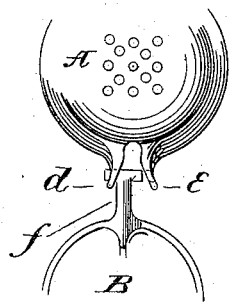
Figure 4:
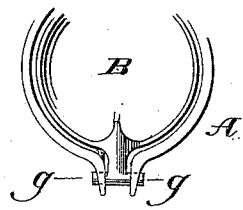
Figure 5:
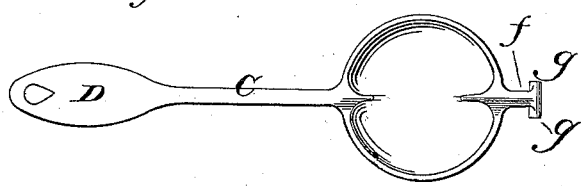
Figure 6:
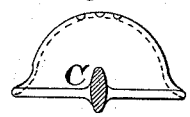

In the annexed drawings, Figure 1 shows the implement complete. Figs. 2, 3, and 4 are illustrative of the means of uniting the two parts thereof. Figs. 5 and 6 illustrate the form and arrangement of the handles. Figs. 2, 3, and 6 show the bowl as inverted.

The implement is comprised entire of two pieces of casting, united without drilling or riveting.

A indicates the bowl, and B the presser, the exterior of which is forced into the bowl in compressing the fruit. The bowl is perforated in the bottom to allow the juice to escape. Both the bowl and presser are of substantially uniform thickness throughout. On the inner surface of the bowl ribs $a$ are cast, and like ribs, $b$, are cast on the exterior of the presser. These ribs run from the pole or apex of the presser toward the rim, and in the same direction in the bowl. The ribs in the bowl do not reach to the top or rim, but terminate abruptly on a circumferential line a short distance below, as seen in Fig. 1, leaving a smooth space above the ends of the ribs. This space, being at the flare of the bowl, will admit lemons of many sizes, and is adapted to receive a half-sphere or cone of a lemon with its base resting on and sustained by the terminal ends of the ribs. By this means the cone of lemon is more positively held and presented for the action of the descending presser than when inserted, as usual, in and so as to rest against the sides of corrugations.

Upon the bottom of the presser, at or near the center, I place a spur, $c$, whose office is to catch into and engage the lemon on the rotund or rind side thereof, and thus bring and hold the lemon under complete control of the presser before and during the squeezing action.

Both the presser and bowl have handles D, formed integral with and placed at the ends of lever-arms C, which are cast with and upon the presser and the bowl. To secure stiffness, with economy of metal, the lever-arms are thin and deep, having their widest diameter parallel to the plane of their movement; and to adapt the handles best to the hand for exerting pressure they are set in the contrary way. In other words, the handles proper, D, are placed flatwise, and the intervening lever-arms edgewise, with respect to the presser and bowl.

An important feature of the invention is the connection of the two parts without a rivet or any riveting. Immediately opposite the handle, cast on the bowl, are two eyes, $d\ e$, and on the presser is cast a stem, $f$, having a cross-bar forming two trunnions, $g\ g$, of a proper size to fit in the eyes on the bowl.

To unite the two parts of the implement, the eyes $d\ e$ are set obliquely on the bowl, preferably at angles converging both laterally and vertically. The vertical angle facilitates the molding, and the lateral or horizontal angle leaves a sufficient space in which to enter the stem and trunnions between the eyes in condition for forcing the eyes over the trunnions, and this, when done in a suitable press, by the same operation straightens the eyes, leaving the hinge completed in proper shape and working order and the parts permanently united without a rivet or any riveting operation. This method of forming the joint not only insures permanence, but economizes labor and reduces cost.

I claim as my invention—

1. In a lemon-squeezer, the bowl having ribs terminating at a line below the top thereof, leaving a smooth space above them, wherein the base of the cone of lemon is received upon the terminal ends of the ribs, in combination with the presser, substantially as described.

2. In a lemon-squeezer, the combination of the bowl part having a handle and a pair of eyes integral therewith, of a presser provided with a handle, and a stem and trunnions, the parts being united by inserting the trunnions in the eyes and bending the latter upon them, as set forth.

FRANK J. HERRICK.

Witnesses:
H. C. NOBLE,
E. M. WIGHTMAN.